United States Patent [19]
Faba

[11] Patent Number: 5,938,261
[45] Date of Patent: Aug. 17, 1999

[54] MOBILE BEVERAGE STATION

[76] Inventor: Paul L. Faba, 16089 Wrotham Ct., Clinton Twp., Mich. 48025

[21] Appl. No.: 08/866,660

[22] Filed: Jun. 5, 1997

Related U.S. Application Data

[60] Provisional application No. 60/027,744, Oct. 3, 1996.

[51] Int. Cl.⁶ .................................................. B60P 3/025
[52] U.S. Cl. ......................... 296/22; 296/24.1; 296/181; 4/625; 4/640
[58] Field of Search ............................. 296/22, 156, 181, 296/24.1, 24.2, 164; 4/625, 626, 639, 640, 642, 663, 664, 665; D12/101, 102, 103

[56] References Cited

U.S. PATENT DOCUMENTS

| | | | |
|---|---|---|---|
| D. 156,547 | 12/1949 | Madison | 296/22 X |
| D. 172,800 | 8/1954 | Miley | D12/102 |
| 489,893 | 1/1893 | Buckley | 296/22 |
| 1,327,248 | 1/1920 | Moody . | |
| 1,720,260 | 7/1929 | Bowen, Jr. et al. . | |
| 2,733,094 | 1/1956 | Carlton | 296/22 |
| 2,767,013 | 10/1956 | Spears . | |
| 3,574,388 | 4/1971 | Stone | 296/24.2 X |
| 3,594,830 | 7/1971 | Clifton | 4/625 |
| 3,608,954 | 9/1971 | Lynd | 296/164 |
| 3,778,099 | 12/1973 | Rogove et al. . | |
| 4,167,983 | 9/1979 | Seider et al. . | |
| 4,270,319 | 6/1981 | Spasojevic | 296/22 X |
| 4,359,073 | 11/1982 | De Stoutz . | |
| 4,453,350 | 6/1984 | Schantz et al. . | |
| 4,513,984 | 4/1985 | Wright | 280/43.23 |
| 5,301,376 | 4/1994 | Herbert | 4/625 X |
| 5,769,478 | 6/1998 | Vernese | 296/181 X |

FOREIGN PATENT DOCUMENTS

| | | | |
|---|---|---|---|
| 3241242 | 5/1984 | Germany | 296/22 |

*Primary Examiner*—D. Glenn Dayoan
*Assistant Examiner*—Chad D Wells
*Attorney, Agent, or Firm*—Lynn E. Cargill; Susan M. Cornwall

[57] ABSTRACT

A mobile beverage station includes a trailer booth and wheels. The front of the trailer booth is curved and formed at least in part by a plurality of flat windows. The station may have an escape hatch in the roof, and the wheels may be out from under the trailer booth. The wheels may be detachable and the trailer booth may be adapted so that, when the wheels are detached, the trailer booth can rest on a support structure and appear as a permanent building structure. Another mobile beverage station includes a trailer booth and a sink set inside the trailer booth. The sink set includes a mop sink, a grey-water storage tank, a vent pipe, a mop sink drainage pipe, a hand sink, a hand sink drainage pipe, and an open-cup drain connector. The vent pipe leads from a side of the grey-water storage tank near the top of the grey-water storage tank to outside the trailer booth. The mop sink drainage pipe has two ends and is connected at one end to the side of the mop sink near the bottom of the mop sink and connected at the other end to a side of the grey-water storage tank near the top of the grey-water storage tank. The open-cup drain connector is connected to the mop sink drainage pipe, and the hand sink drainage pipe leads from the hand sink to the open-cup drain connector.

10 Claims, 3 Drawing Sheets

MOBILE BEVERAGE STATION

This patent application claims the benefit of prior filed copending U.S. Provisional Patent Application No. 60/027,744 filed on Oct. 3, 1996, which Provisional Patent Application is incorporated by reference herein.

BACKGROUND OF THE INVENTION

1. Field of the Invention

The present invention relates generally to mobile beverage stations and, more particularly, to mobile beverage stations having an enclosed space in which a person may prepare beverages.

2. Description of the Related Art

The number of coffee houses and coffee carts in the United States has been quickly increasing as more people more often are enjoying the many flavors of coffee and related beverages. Currently there are pushable beverage carts and stationary coffee houses. However there is a need for a mobile beverage station which is larger than a pushable beverage cart and may be placed where and when it is desirable to have a beverage station to meet seasonal demands or to be available at special events, etc. It would be advantageous if the mobile beverage station has an appealing exterior design, is sturdy in construction, has a sheltered area in which a person may prepare various beverages, has a serving window, and, optionally, a drive-through serving window, and is equipped with the necessary equipment for making the beverages, such as an on-board fixed water system. With respect to the fixed water system, it is desirable that the system require a small amount of space.

It is, therefore, one object of the present invention to provide a mobile beverage station.

It is another object of the present invention to provide a mobile beverage station having an appealing exterior design.

It is yet another object of the present invention to provide a mobile beverage station which is sturdy in construction.

It is still another object of the present invention to provide a mobile beverage station which houses an area in which a person can prepare beverages.

It is a further object of the present invention to provide a mobile beverage station which has a serving window which may be positioned as a drive-through serving window.

It is yet a further object of the present invention to provide a mobile beverage station which is equipped with an on-board fixed water system which requires a small amount of space.

SUMMARY OF THE INVENTION

To achieve the foregoing objects, one embodiment of the present invention is a mobile beverage station which includes a trailer booth having a roof, a floor, a front wall, a back wall, two side walls, a serving window, and a door. The roof, floor and walls encompass a space inside the trailer booth sized to provide enough room for a person to prepare beverages inside the trailer booth. The front wall of the trailer booth is curved and formed at least in part by a plurality of flat windows. The mobile beverage station also has wheels which support the trailer booth and provide mobility to the beverage station. The mobile beverage station may have an escape hatch in the roof, and the wheels may be out from under the trailer booth. In addition, the wheels may be detachable and the trailer booth may be adapted so that, when the wheels are detached, the trailer booth can rest on a support structure and appear as a permanent building structure.

Another embodiment of the present invention is a mobile beverage station which includes a trailer booth and a sink set inside the trailer booth. The sink set includes a mop sink and a grey-water storage tank. The mop sink has a bottom and at least one side, and the grey-water storage tank has a top and at least one side. The mop sink is located on top of the grey-water storage tank and is in fluid communication with the grey-water storage tank so that liquid in the mop sink may be drained into the grey-water storage tank.

The mobile beverage station with the sink set may further include a vent pipe, a mop sink drainage pipe, a hand sink, a hand sink drainage pipe, and an open-cup drain connector. The vent pipe leads from a side of the grey-water storage tank near the top of the grey-water storage tank to outside the trailer booth. The mop sink drainage pipe has two ends and is connected at one end to the side of the mop sink near the bottom of the mop sink and connected at the other end to a side of the grey-water storage tank near the top of the grey-water storage tank. The open-cup drain connector is connected to the mop sink drainage pipe, and the hand sink drainage pipe leads from the hand sink to the open-cup drain connector.

Other objects, features, and advantages of the present invention will be readily appreciated as the same becomes better understood after reading the subsequent description taken in conjunction with the appendant drawings.

DESCRIPTION OF THE PREFERRED EMBODIMENT(S)

Figure 1:
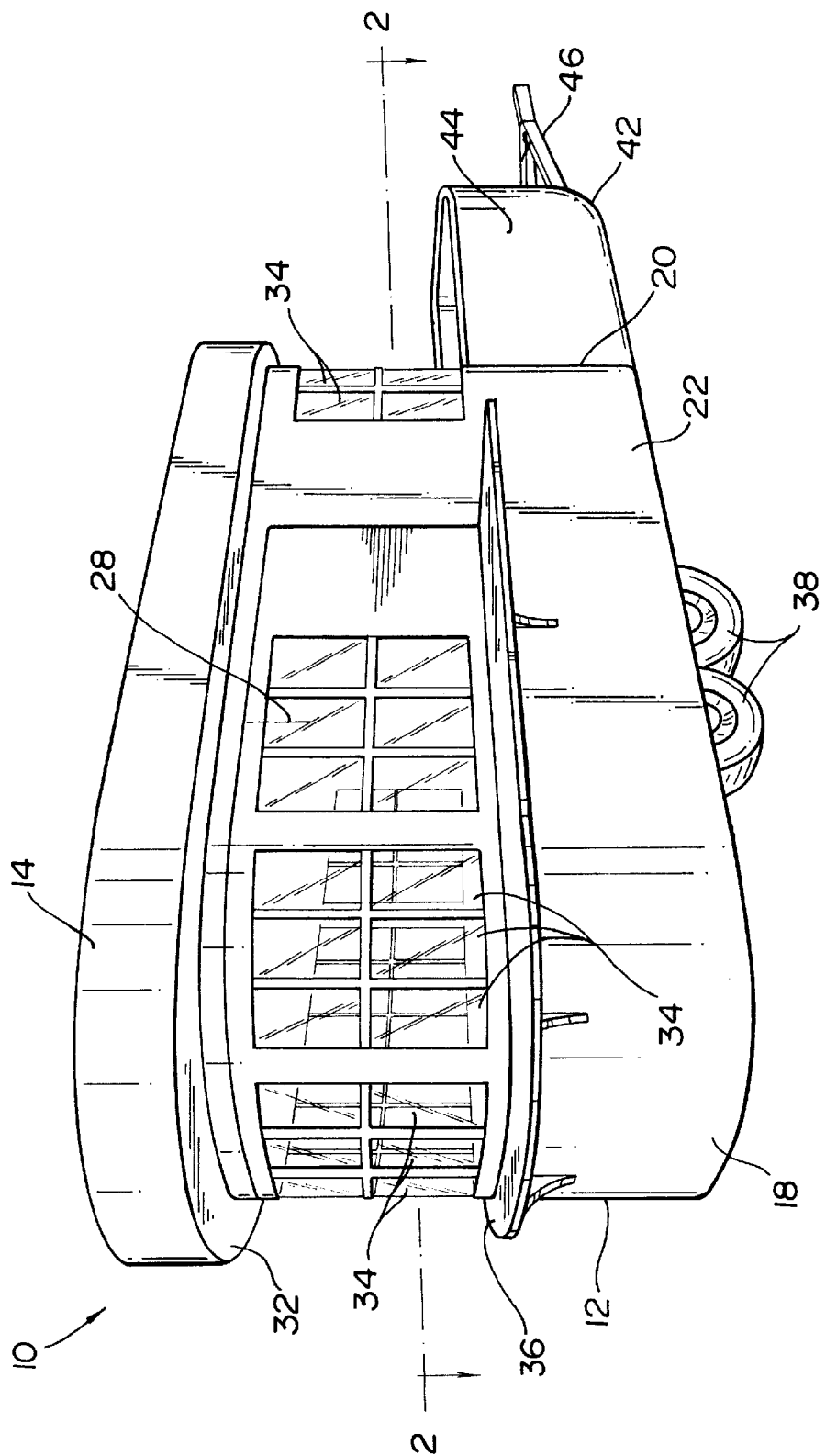
FIG. 1 is a perspective view of a mobile beverage station according to the present invention.
Figure 2:
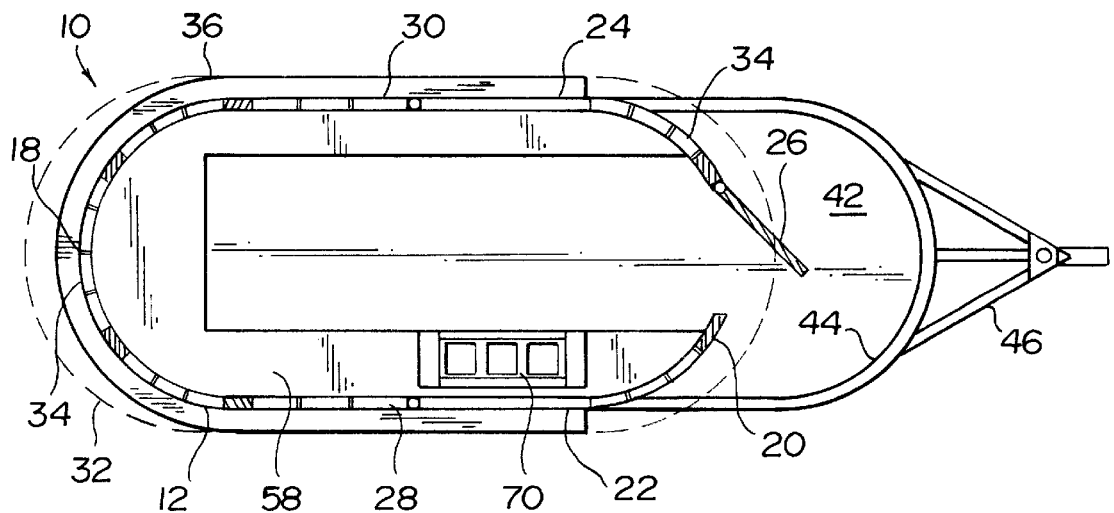
FIG. 2 is a sectional view of the mobile beverage station of FIG. 1, the section as cut along line 2—2 of FIG. 1 and viewed in the direction of the arrows.
Figure 3:
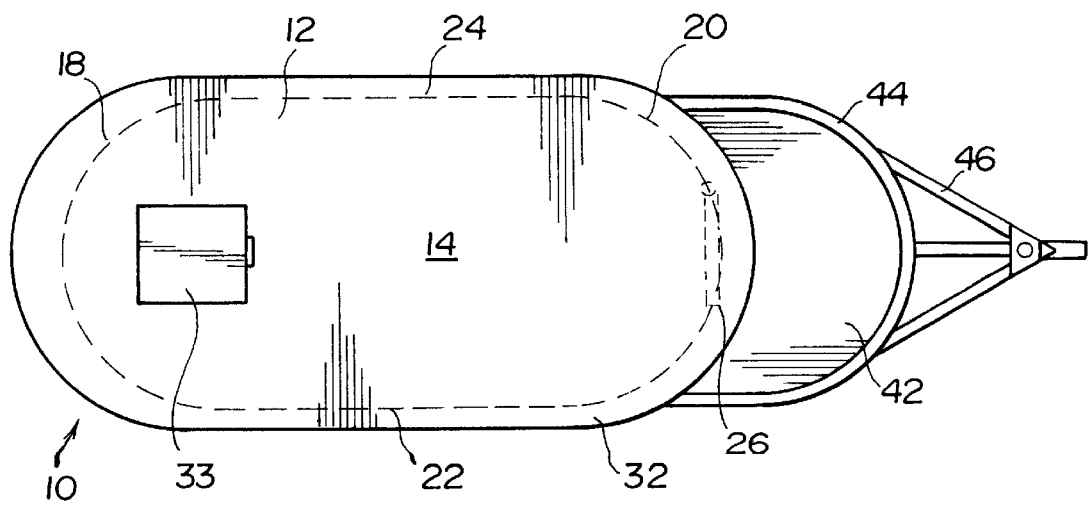
FIG. 3 is a top view of the mobile beverage station of FIG. 1.

One embodiment of the present invention is mobile beverage station 10 represented in FIGS. 1–3. FIG. 1 is a perspective view of mobile beverage station 10, FIG. 2 is a cross sectional view of mobile beverage station 10, and FIG. 3 is a top view of mobile beverage station 10. The section of the sectional view in FIG. 2 is taken along line 2—2 of FIG. 1 and shown in the direction of the arrows.

Mobile beverage station 10 generally includes trailer booth 12 having roof 14, floor 16, walls which include front wall 18, back wall 20, and side walls 22 and 24, back door 26, and serving windows 28 and 30. Walls 18, 20, 22, and 24 form the front, back, and sides of trailer booth 12, respectively. Mobile beverage station 10 may vary in width and length; however, preferred widths range from about 7 feet to about 12 feet, and preferred lengths range from about 8 feet to about 20 feet. It is preferred that the walls be formed of galvanized steel, e.g., 14 Gage galvanized steel. The exterior may be coated with two-part epoxy, urethane, or other suitable finish. Advantageously, a space for a sign is available on the exterior of mobile beverage station 10.

Roof 14 is desirably formed of fiberglass which is an economical material with durable qualities. Roof 14 has awning 32 which extends over the entire perimeter of trailer booth 12. It is advantageous that awning 32 extend substantially the length (at least %10 of the length) of the sides of trailer booth 12 to provide the customers with some protection from inclement weather. A typical awning extends about 6 inches outwardly from the sides of the trailer booth.

Roof 14 also has escape hatch 33, shown in the top view of trailer booth 12 in FIG. 3. Escape hatch 33 is basically an opening in roof 14 with a door which is sized to allow a person to escape when necessary, e.g., when there is a fire in the trailer booth. Escape hatch 33 is preferably positioned near the front of the trailer booth as shown, as it is thereby located away from back door 26, providing two spaced-apart escape routes.

Roof 14, floor 16, and walls 18, 20, 22, and 24 encompass a space inside trailer booth 12 sized to provide enough room in which a person may prepare beverages. The inside of trailer booth 12 will be discussed further herein below.

Figure 4:
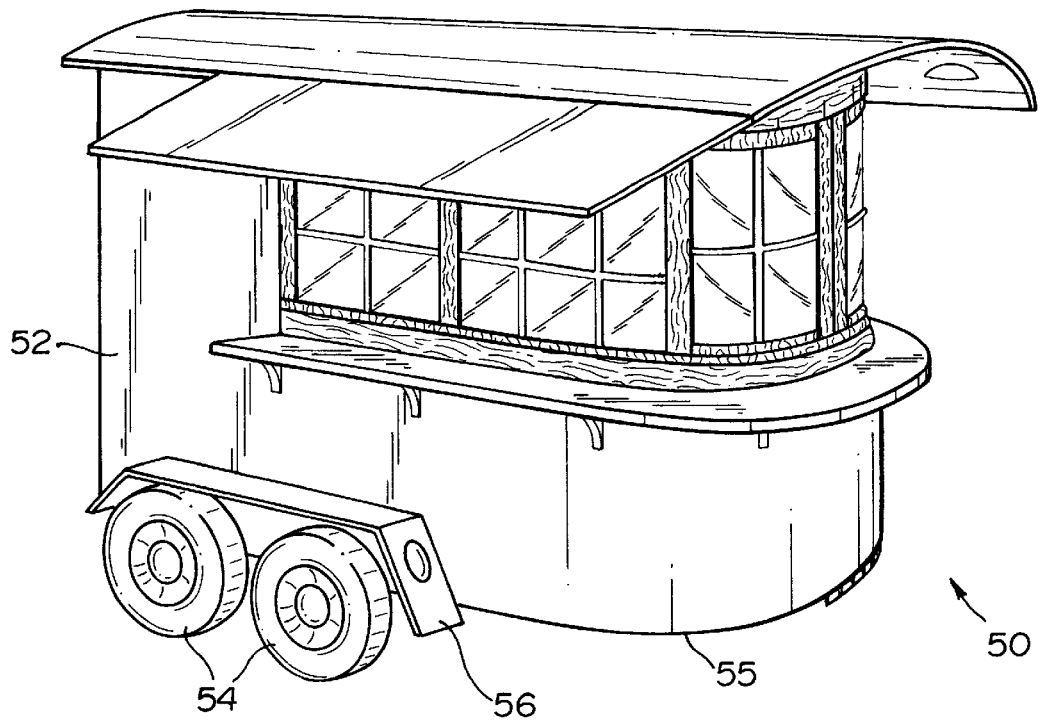
FIG. 4 is a perspective view of another mobile beverage station according to the present invention.

The front and back of trailer booth 12 are curved and formed by walls 18 and 20, respectively, which include flat windows 34. Preferably, windows 34 are formed of tempered safety glass and trimmed with wood. Each window on trailer booth 12 is formed of flat glass, even though the appearance of both the front and back of trailer booth 12 is rounded. Windows 34 are shown in vertical pairs, and every vertical pair of flat windows 34 is planar. However, each vertical pair of flat windows 34 in the front and back of trailer booth 12 is positioned at an angle relative to an adjacent vertical pair of flat windows 34 which results in the rounded appearance of the front and back of the trailer booth. Preferably, there are at least nine vertical pairs of flat windows 32. Alternative to the design shown in FIGS. 1 and 2, the trailer booth may be rounded only in the front as shown in FIG. 4.

As mentioned, windows 28 and 30 are serving windows. Windows 28 and 30 are designed to swing open. Alternatively, one or both of the windows may be designed to slide open or be capable of opening in any other known manner. Optionally, other windows, such as a window in the front of trailer booth 12 may also open. In some instances, it is preferred that at least one of the windows 28 or 30 be positioned at a height such that the window could serve as a drive-through window. Otherwise, the serving windows are typically designed to serve walk-up customers.

Trailer booth 12 also has counter 36 along a portion of its exterior, in this instance, along the front and along a majority of the sides of trailer booth 12. Counter 36 is positioned at a height convenient for standing customers to place their beverages. Counter 36 is stationary in that it does not fold down; although, optionally, counter 36 may fold down. A typical depth for counter 36 is about 6".

The mobile beverage station of the present invention also has wheels which support the trailer booth and provide the mobility of the beverage station. Mobile beverage station 10 has four wheels, two wheels 38 on one side and two wheels (not shown) on the other side. The four wheels revolve on dual axles (not shown). The wheels are preferably 14½" diameter wheels and are detachable from trailer booth 12. Trailer booth 12 is adapted so that, upon removal of the wheels, trailer booth 12 can rest on a support structure, such as a set of blocks. The support structure is present to keep the trailer booth slightly above the ground to protect portions of any systems, such as the plumbing system, from getting damaged by the weight of the trailer booth. Once the trailer booth is resting on such a support structure, a skirt may be placed around the perimeter of the trailer booth to hide the support structure and to give the appearance that the trailer booth is a permanent building structure. The skirt may be formed of any suitable material, such as metal, cloth, bricks, or fiberglass.

Mobile beverage station 10 also includes a braking system, e.g., an electrical hydraulic braking system.

At the back of trailer booth 12 is back porch 42 with a railing covered with vinyl canvas 44. Back porch 42 may be designed to provide a step up before stepping up again to enter trailer booth 12.

Furthermore, trailer booth 12 has detachable trailer hitch 46 at the back thereof, from which trailer booth 12 is pulled by a truck or other suitable vehicle.

FIG. 4 shows mobile beverage station 50 having trailer booth 52 and wheels 54. Trailer booth 52 has floor 55. Mobile beverage station 50 has four wheels, two wheels on one side and two wheels (not shown) on the other side. Each pair of wheels is covered by a fender, preferably, formed of fiberglass. One fender 56 is shown. The four wheels revolve on dual axles (not shown) and are not directly below floor 55 of trailer booth 52. In other words, the wheels are "out from under" trailer booth 52. The positioning of the wheels being out from under trailer booth 52 improves the life of the wheels and floor 55, as the wheels and the floor do not rub against one another during transport of the mobile beverage station.

The space inside the trailer booths of the present invention is ample enough for a person to comfortably prepare beverages. The ceiling height is preferably greater than 6', e.g., 6'8" is a good ceiling height, and the doors and aisles are preferably at least about 30" wide. The trailer booths are advantageously electrically wired so that they can be connected to an electrical source by a 220 V/50 Amp Shorepower cord.

Trailer booths 12 and 52 desirably have heating and cooling systems, insulated walls, and indoor and outdoor shielded lighting. If trailer booths 12 and 52 are not equipped with air conditioning systems, it is desirable that the booths have ceiling vents with motorized fans. Inside trailer booth 12 are shown counters 58, preferably formed of stainless steel.

Figure 5:
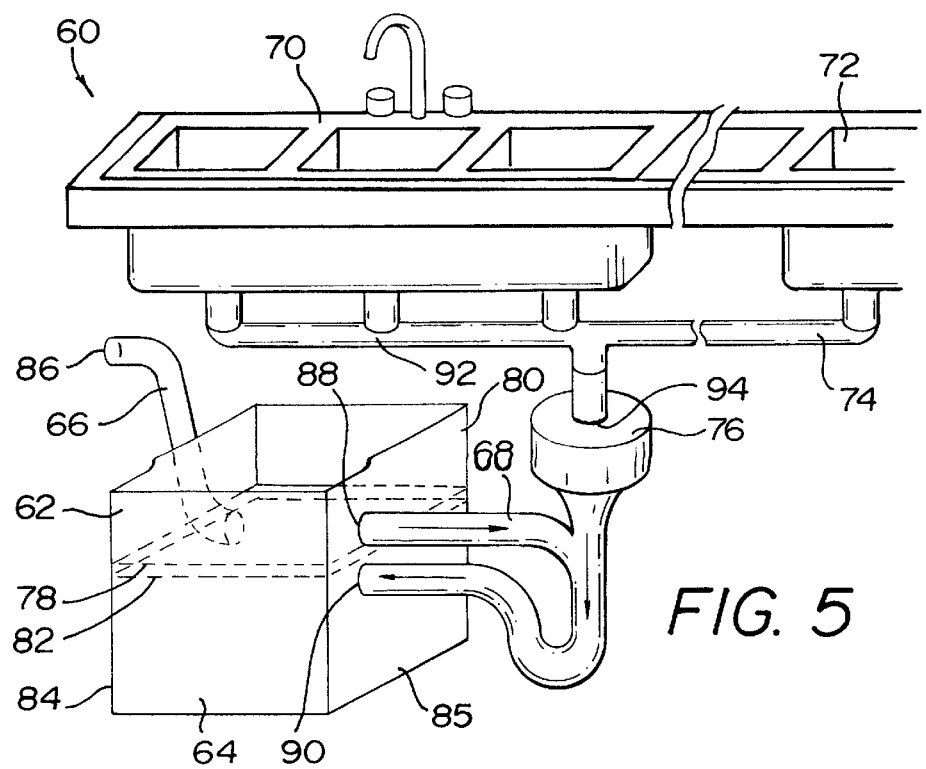
FIG. 5 is a perspective view of a fixed water system useful for mobile beverage stations of the present invention.

Preferably, the trailer booths of the present invention include a fixed water system. One design of a fixed water system includes sink set 60, as shown in FIG. 5. Sink set 60 includes mop sink 62 on top of grey-water storage tank 64, vent pipe 66, mop sink drainage pipe 68, three-compartment sink 70, hand sink 72, hand sink drainage pipe 74, and open-cup drain connector 76. An exemplary placement of three-compartment sink 70 is shown in FIG. 2.

Mop sink 62 has bottom 78 and side 80, and grey-water storage tank 64 has top 82 and sides 84 and 85. Vent pipe 66 leads from side 84, near top 82, of grey-water storage tank 64 to outside the trailer booth at 86. Mop sink 62 is in fluid communication with grey-water storage tank 64 via mop sink drainage pipe 68 so that liquid in the mop sink may be drained into the grey-water storage tank. Mop sink drainage pipe 68 has ends 88 and 90. End 88 is connected to side 80, near bottom 78, of mop sink 62, and end 90 is connected to side 85, near top 82, of grey-water storage tank 64. Open-cup drain connector 76 is connected to mop sink drainage pipe 68, and hand sink drainage pipe 74 leads from hand sink 72 to open-cup drain connector 76. Hand sink drainage pipe 74 is tied with three-compartment sink drainage pipe 92 at outlet 94 which drains into open-cup drain connector 76. Open-cup drain connector 76 provides an open-air drain gap, so that, if mop sink 62 or grey-water storage tank 64 overflow, the overflow would not back up into three-compartment sink 70 or hand sink 72. The arrows show the typical direction of flow of liquids through mop sink drain pipe 68 and open-cup drain connector 76.

The fixed water system also preferably includes an electric water heater, fresh water tank(s), and water pump(s).

Trailer booth 12 should be equipped with all the equipment necessary to prepare the beverages desired. Such equipment includes refrigerators, ice makers, and coffee machines.

The mobile beverage stations of the present invention may be adapted so that the stations may be moved by lifting the stations with a crane. Such adaptation may include the provision of eye hooks attached near the top of the mobile beverage station or holes near the top of the mobile beverage station in which eye hooks may be inserted. Further provisions which may be included with a mobile beverage station of the present invention are indoor bathroom(s) and a stereo/CD system.

The mobile beverage station of the present invention may be made by techniques well known in the automotive and camper industries. During the general use of a mobile beverage station of the present invention, such as mobile beverage station 10, a person enters through back door 26, can take customer orders at either serving window 28 or 30, prepares the ordered beverages using the equipment and supplies contained in mobile beverage station 10, and gives the customers the prepared beverages through either serving window 28 or 30, where payment is also received from the customer.

Accordingly, the mobile beverage stations of the present invention have appealing exterior designs, are sturdy in construction, house areas in which a person can prepare beverages, have serving windows which may be positioned as drive-through serving windows, are equipped with on-board fixed water systems which require a small amount of space.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A mobile beverage station, comprising:
    a trailer booth having a roof, a floor, a front wall, a back wall, two side walls, a serving window, and a door, the roof, floor and walls encompassing a space inside the trailer booth sized to provide enough room for a person to prepare beverages inside the trailer booth, the front wall of the trailer booth being rounded and having first and second regions, the first region being below the second region and being a curved and rounded windowless region and the second region formed at least in part by a plurality of flat windows, wherein each flat window adjacent another flat window is positioned at an angle relative to its adjacent flat window so that the plurality of flat windows approximates the shape of the curved, rounded first region; and
    wheels supporting the trailer booth and providing mobility to the beverage station.

2. The mobile beverage station of claim 1, wherein the trailer booth has a stationary counter along a portion of the exterior of the trailer booth.

3. The mobile beverage station of claim 1, wherein the trailer booth has an awning extending substantially the length of the sides of the trailer booth.

4. The mobile beverage station of claim 1, wherein the trailer booth has an escape hatch in the roof, the escape hatch including an opening and a door which are sized to allow a person to escape.

5. The mobile beverage station of claim 1, wherein the trailer booth has a fixed water system which includes a grey-water storage tank.

6. A mobile beverage station, comprising:
    a trailer booth having a roof, a floor, a front wall, a back wall, two side walls, a serving window, a door, and an escape hatch in the roof, the roof, floor and walls encompassing a space inside the trailer booth sized to provide enough room for a person to prepare beverages inside the trailer booth, the front wall of the trailer booth being rounded and having first and second regions, the first region being below the second region and being a curved and rounded windowless region and the second region being formed at least in part by a plurality of flat windows, wherein each flat window adjacent another flat window is positioned at an angle relative to its adjacent flat window so that the plurality of flat windows approximates the shape of the curved, rounded first region; and
    detachable wheels supporting the trailer booth and providing mobility to the beverage station, the wheels being out from under the trailer booth,
    the trailer booth being adapted so that, when the wheels are detached, the trailer booth can rest on a support structure and appear as a permanent building structure.

7. A mobile beverage station, comprising a trailer booth and a sink set inside the trailer booth, the sink set including a mop sink and a grey-water storage tank, the mop sink having a bottom and at least one side and the grey-water storage tank having a top and at least one side, the mop sink being located on top of the grey-water storage tank and being in fluid communication with the grey-water storage tank so that liquid in the mop sink may be drained into the grey-water storage tank, the sink set also including a vent pipe leading from a side of the grey-water storage tank near the top of the grey-water storage tank to outside the trailer booth.

8. A mobile beverage station, comprising a trailer booth and a sink set inside the trailer booth, the sink set including a mop sink and a grey-water storage tank, the mop sink having a bottom and at least one side and the grey-water storage tank having a top and at least one side, the mop sink being located on top of the grey-water storage tank and being in fluid communication with the grey-water storage tank by way of a mop sink drainage pipe having two ends and being connected at one end to the side of the mop sink near the bottom of the mop sink and being connected at the other end to a side of the grey-water storage tank near the top of the grey-water storage tank so that liquid in the mop sink may be drained into the grey-water storage tank.

9. The mobile beverage station of claim 8, further comprising a hand sink, a hand sink drainage pipe, and an open-cup drain connector, the open-cup drain connector being connected to the mop sink drainage pipe, and the hand sink drainage pipe leading from the hand sink to the open-cup drain connector.

10. A mobile beverage station, comprising a trailer booth and a sink set inside the trailer booth, the sink set including a mop sink, a grey-water storage tank, a vent pipe, a mop sink drainage pipe, a hand sink, a hand sink drainage pipe, and an open-cup drain connector, the mop sink having a bottom and at least one side and the grey-water storage tank having a top and at least one side, the mop sink being located on top of the grey-water storage tank, the vent pipe leading from a side of the grey-water storage tank near the top of the grey-water storage tank to outside the trailer booth, the mop sink drainage pipe having two ends and being connected at one end to the side of the mop sink near the bottom of the mop sink and being connected at the other end to a side of the grey-water storage tank near the top of the grey-water storage tank, the open-cup drain connector being connected to the mop sink drainage pipe, and the hand sink drainage pipe leading from the hand sink to the open-cup drain connector.

\* \* \* \* \*